(12) United States Patent
Liu

(10) Patent No.: US 6,591,673 B1
(45) Date of Patent: Jul. 15, 2003

(54) METHODS FOR IDENTIFYING FLUID TYPES OF UNDERGROUND FORMATIONS

(75) Inventor: Cheng Bing Liu, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 70 days.

(21) Appl. No.: 09/980,128

(22) PCT Filed: Jun. 6, 2000

(86) PCT No.: PCT/IB00/00757

§ 371 (c)(1),
(2), (4) Date: Nov. 28, 2001

(87) PCT Pub. No.: WO00/75695

PCT Pub. Date: Dec. 14, 2000

(30) Foreign Application Priority Data

Jun. 8, 1999 (GB) .............................. 9913356

(51) Int. Cl.⁷ .......................... G01V 3/38; G01V 11/00; G01V 3/20
(52) U.S. Cl. .............................. 73/152.18; 73/152.42; 73/152.55; 166/252.5; 166/254.2; 324/346; 324/366
(58) Field of Search .......................... 73/152.18, 152.31, 73/152.55, 152.42; 166/250.033, 252.5, 254.2; 324/346, 366

(56) References Cited

U.S. PATENT DOCUMENTS

| | | | | |
|---|---|---|---|---|
| 2,699,675 A | * | 1/1955 | Buck et al. ............... | 73/152.31 |
| 2,700,897 A | * | 2/1955 | Arps ....................... | 73/152.42 |
| 3,254,531 A | * | 6/1966 | Briggs, Jr. ............... | 73/152.31 |
| 3,371,527 A | * | 3/1968 | Moulin .................... | 73/152.42 |
| 3,525,258 A | * | 8/1970 | Fowler et al. ........... | 73/152.31 |
| 3,962,674 A | | 6/1976 | Howell ................. | 340/15.5 AC |
| 4,441,362 A | * | 4/1984 | Carlson ................... | 73/152.42 |
| 4,506,548 A | | 3/1985 | Zemanek, Jr. ............. | 73/152 |
| 4,517,836 A | | 5/1985 | Lyle, Jr. et al. ............... | 73/152 |
| 4,831,530 A | * | 5/1989 | Rai ............................ | 364/421 |
| 4,885,540 A | * | 12/1989 | Snoddy et al. .............. | 324/318 |
| 4,962,665 A | * | 10/1990 | Savage et al. ........... | 73/152.42 |
| 4,974,446 A | * | 12/1990 | Vigneaux ................. | 73/152.55 |
| 5,335,542 A | * | 8/1994 | Ramakrishnan et al. . | 73/152.08 |
| 5,497,321 A | | 3/1996 | Ramakrishnan et al. .... | 364/422 |
| 5,581,024 A | * | 12/1996 | Meyer, Jr. et al. ....... | 73/152.03 |
| 5,633,590 A | | 5/1997 | Vail, III ..................... | 324/368 |
| 5,736,637 A | * | 4/1998 | Evans et al. ............. | 73/152.31 |
| 5,812,068 A | | 9/1998 | Wisler et al. ........... | 340/855.5 |

* cited by examiner

Primary Examiner—Hezron Williams
Assistant Examiner—David J. Wiggins
(74) Attorney, Agent, or Firm—Robin Nava; Brigitte L. Jeffery; John Ryberg

(57) ABSTRACT

A method of identifying the fluid type of subterranean formations according to the correlation between the variation trend of electrical resistivity with depth downhole in a borehole and the variation trend of porosity with depth downhole in the same borehole. The method includes the steps of: a) determining the rate of change with depth of a resistivity parameter (such as deep resistivity) of the formation surrounding the borehole; b) determining the rate of change with depth of a porosity parameter (such as total porosity and/or free fluid porosity measured by a nuclear magnetic resonance technique) of the formation surrounding the borehole; c) determining a comparison of the rate of change with depth of such resistivity parameter and the rate of change with depth of such porosity parameter for a given depth in the borehole; and d) using the comparison to determine the nature of the fluid in the formation surrounding the borehole at that depth downhole or in a given depth window downhole.

20 Claims, 5 Drawing Sheets

— T2 LONG WAIT TIME
•••• T2 SHORT WAIT TIME

METHODS FOR IDENTIFYING FLUID TYPES OF UNDERGROUND FORMATIONS

TECHNICAL FIELD

The present invention relates to methods of interpreting borehole logging data to determine the presence of hydrocarbons in underground formations.

BACKGROUND ART

Qualitatively identifying fluid type of formations based on log curves before further data processing and interpretation is often the key to successful formation evaluation. A petrophysicist will often wish to identify qualitatively the fluid type (hydrocarbon or water) of a formation first and then quantitatively compute various physical properties (such as mineralogy, porosity, saturation, intrinsic and phase permeabilities) of the formation using this knowledge of fluid type to guide the interpretation.

There are presently three main methods for qualitatively identifying fluid type of underground formations: a) electrical resistivity absolute value method, b) three resistivities invasion profile method and c) NMR method. These three methods each have their own advantages weak points and application ranges, and each of them can only be used in certain conditions.

a) Resistivity Absolute Value Method(RAV-M)

The RAV-M is a method which identifies the fluid type of formations according to the deep investigating resistivity log readings in different formations or different parts of one formation (see FIG. 1). The required logs by RAV-M are deep investigating resistivity Rd, effective porosity PHIe and clay volume Vcl. FIG. 1 shows the variation with depth of Rd, PHIe and Vcl when passing from a hydrocarbon zone HC to a water zone W. The required assumption by RAV-M is that the Rw values (the resistivity of formation water) in the different formations or different parts of one formation associated with the analysis are equal. The required working conditions are that the PHIe and Vcl in different formations or different parts of one formation associated with the analysis are equal and there is at least one formation (or one part of a formation) which is hydrocarbon-bearing and another formation (or part of a formation) which is water bearing. The advantage of this method is that it requires only measurement of Rd, PHIe and Vcl for identifying the fluid type of the formation(s). The weak points of this method are: i) the working condition that PHIe and Vcl in different formations or different parts of one formation associated with the analysis are equal is sometimes hard to meet, ii) the working condition that there is at least one formation (or part of a formation) which is hydrocarbon-bearing and another formation (or part of a formation) which is water bearing is normally hard to meet, and iii) the required assumption that Rw values in different formations or different parts of one formation associated with the analysis are equal is usually too hard to meet.

b) Three-Resistivity Invasion Profile Method(TRIP-M)

The TRIP-M is a method which identifies the fluid type of formations according to the order of three resistivity logs with deep, medium and shallow investigating depth (invasion profile) in a single formation (see FIG. 2). The required logs by TRIP-M are three resistivity logs with deep, medium and shallow investigating depth Rd, Rm, Rs and spontaneous electrical potential log SP. FIG. 2 shows the variation of these over depth for a hydrocarbon zone HC and a water zone W. The required working conditions are that the mud must be fresh water-based or oil-based mud, the ratio of the mud filtrate resistivity Rmf and the formation water resistivity Rw must be great than 1, and there must be an invasion profile existing which does not contain a low resistivity annulus and can be investigated by the three resistivity logs. The advantages of this method are that the method requires only Rd, Rm, Rs and SP for identifying the fluid type of formations, it does not need to know Rw, and does not need the working condition that are at least one formation (or part of a formation) is hydrocarbon-bearing and another formation (or part of a formation) which is water-bearing. The weak points of this method are that the required working conditions by this method cannot be met in many cases.

c) Nuclear Magnetic Resonance Method (NMR-M)

NMR-M is a method which identifies the fluid type of formations according to the difference between two T2 spectrums, one measured with long wait time and another measured with short wait time). FIG. 3 shows that variation of the T2 spectra for a hydrocarbon zone HC and a water zone W. The required working conditions of the NMR-M are that there is a certain amount of hydrocarbon in the zone of investigation of the NMR tool (which is usually the flushed zone) and the physical properties of the hydrocarbon in the formations should be understood to a certain degree. Differential spectrum processing with appropriate software is required. The advantages of this method are that the method requires only two T2 spectrums for identifying the fluid type of formations, and does not need other working conditions. The weak points of this method are that the required working conditions cannot be met in many cases either because there is usually little residual hydrocarbon in the flushed zone (especially for the light oil or gas reservoirs of low porosity) or it is hard to know the physical properties of the hydrocarbon in the formations. Another weak point of this method is that the differential spectrum analysis is a complex computation rather than a quick qualitative analysis.

Besides the three methods mentioned above, there are a few other methods for identifying fluid type of formations such as formation pressure gradient method (FPG-M), carbon/oxygen method (C/O-M) and time-lapse method (TL-M). These methods are very useful sometimes, but they are not used very often either because the required logging services are not available or because the required working conditions are hard to meet or because they are not suitable for quick qualitative analysis or because length of logging time and the high cost restrict their extensive applications.

SUMMARY OF THE INVENTION

The method according to the present invention (called "Resistivity-Porosity Correlation Method" or "RPC-M") is a method which identifies the fluid type of formations according to the correlation between the variation trend of electrical resistivity with depth and the variation trend of porosity with depth.

The present invention provides a method for determining the nature of a formation fluid surrounding a borehole, comprising:
 a) determining the rate of change with depth of a resistivity parameter of the formation surrounding the borehole;
 b) determining the rate of change with depth of a porosity parameter of the formation surrounding the borehole;
 c) determining a comparison of the rate of change with depth of a resistivity parameter and the rate of change with depth of a porosity parameter for a given depth in the borehole; and d) using the comparison to determine the nature of the fluid in the formation surrounding the borehole at that depth (or in a given depth window).

The resistivity parameter is preferably a deep resistivity (Rd) measurement made by any suitable resistivity logging tool. The porosity parameter is preferably a measurement of total porosity (PHIt) such as can be made by Schlumberger's CMR magnetic resonance logging tool.

One embodiment of the invention includes determination of the rate of change with depth of two parameters relating to porosity, preferably the total porosity (PHIt) and the free fluid porosity (PHIff), the rates of change of these two parameters being compared with the rate of change with depth of the resistivity parameter to determine the fluid type.

The comparison of rates of change can be made in either direction, either with increasing depth or decreasing depth, provided that the direction of the rate of change of the parameters is the same. In this application, unless otherwise indicated, all changes and rates of change are made with increasing depth. However, the invention includes the reverse situation (e.g. if parameters are compared as having positive and negative rates of change of with increasing depth, this also includes negative and positive rates of change with decreasing depth, or positive and negative rates of change of with decreasing depth. etc.).

The fluid types of interest are water and hydrocarbon. The method preferably outputs the comparison as a value, the magnitude of which indicating the size of the comparison and the sign (or some other indicator) indicating the nature of the fluid. The magnitude can be used as an estimate of the accuracy (confidence) of the determination of the fluid type. The estimation output can also be corrected by know physical laws, e.g. hydrocarbon always being above water in a given fluid bearing bed.

BEST MODE FOR CARRYING OUT THE INVENTION

The present invention relies on the relationship between porosity, resistivity and saturation which is summarized in the Archie equation:

$$Sw^n = \frac{a}{\phi^m}\frac{Rw}{Rt}$$

Sw is water saturation, $\Phi$ is porosity, Rw is formation water resistivity and Rt is true formation resistivity. a, m and n are derived factors. The Archie equation can be expressed in a number of ways. For the present invention, it is assumed that m=n=2 and a=b=1 (m,n,a,b are all factors of Archie equations. The absolute values of these factors is not important in RPC-M provided that they are constant within a single formation, because RPC-M uses only the variations of resistivity and porosity rather than their absolute values). The Archie equation can be written as:

$$\sqrt{\sqrt{Ct}}=\sqrt{Cw}*PHIw+\sqrt{Cclw}*PHIclw$$

(note: in this and the following equations, t, w, ff and clw represent true, free water, free fluid and clay-bound water parameters respectively).

Assuming Cclw=D*Cw, then $$\sqrt{\sqrt{Ct}}=\sqrt{Cw}*PHIw+\sqrt{D*Cw}*PHIclw$$

$$\sqrt{\sqrt{Ct}}=\sqrt{Cw}(PHIw+\sqrt{D}*PHIclw)$$

D≈1 in a single formation, so $$\sqrt{\sqrt{Ct}}=\sqrt{Cw}(PHIw+PHIclw)$$

$$Ct=Cw(PHIw+PHIclw)^2$$

$$Rt=Rw(PHIw+PHIclw)^{-2} \quad (1)$$

Because deep resistivity Rd is normally used rather than true resistivity Rt in RCP-M method, Rt=E*Rd is introduced in the equation (1) which becomes:

$$Rd=E*Rw(PHIw+PHIclw)^{-2} \quad (2)$$

E≧1.

For a water bearing formation:

$$PHIw+PHIclw=PHIt$$

so equation (2) becomes $$Rd=E*Rw(PHIt)^2 \quad (3)$$

Figure 1:
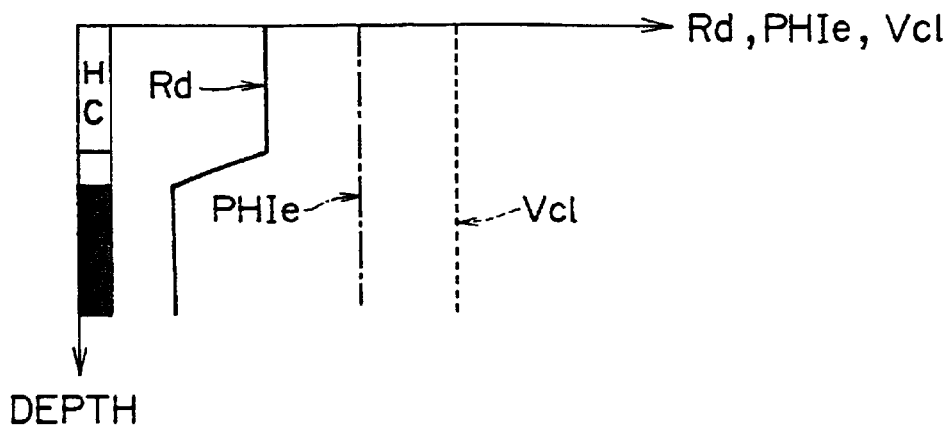
FIG. 1 shows the variation of Rd, PHIe and Vcl with depth in the RAV-M method.
Figure 2:
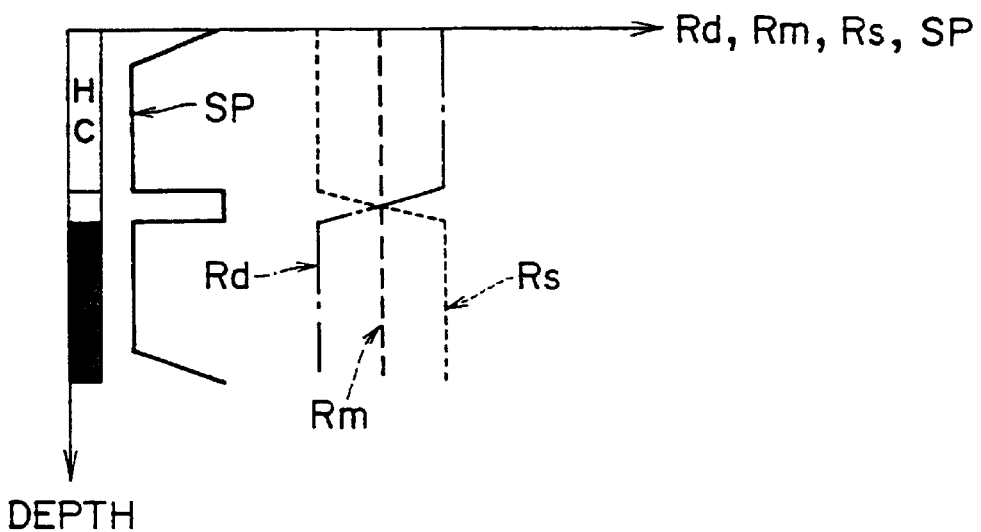
FIG. 2 shows the variation of Rd, Rm, Rs and SP with depth in the TRIP-M method.
Figure 3:
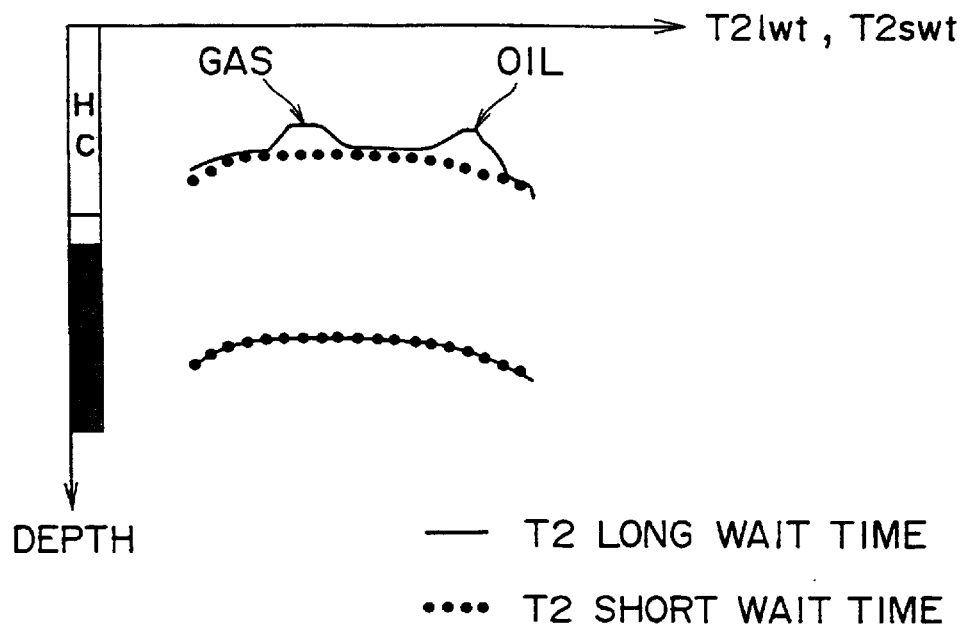
FIG. 3 shows the variation of T2 long and T2 short wait times for the NMR-M method.
Figure 4:
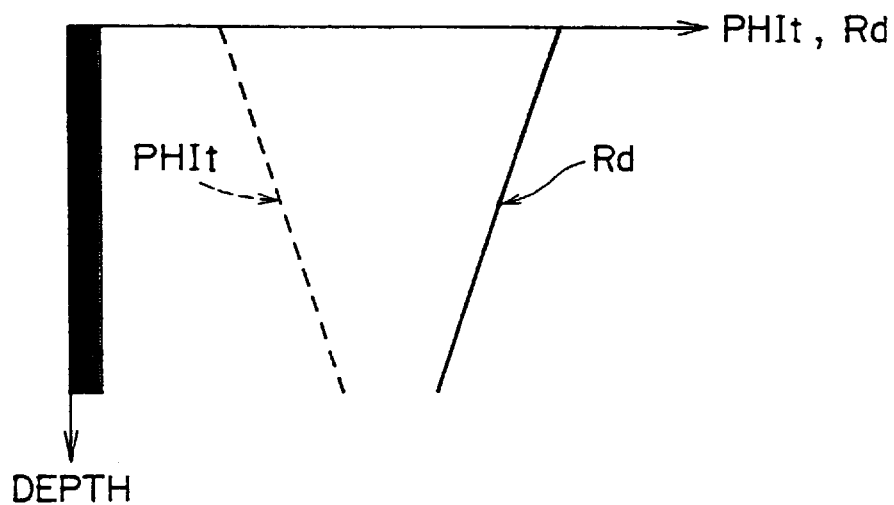
FIG. 4 shows the variation of Rd and PHIt in a water-bearing formation.

Because the formation water resistivity Rw is constant in a single formation, that is Rw=C, Rd is only related to PHIt (see FIG. 4, W=water zone). In a water bearing formation, Rd and PHIt change in opposite directions over depth (PHIt increases while Rd decreases, or vice versa). The rate of the Rd decreasing with the PHIt increasing is dRd/dPHIt= 2E*Rw*PHIt.

For hydrocarbon-bearing formations:

$$PHIw+PHIclw=PHIt-PHIff$$

so equation (2) becomes $$Rd=E*Rw(PHIt-PHIff)^{-2} \quad (4)$$

Figure 5:
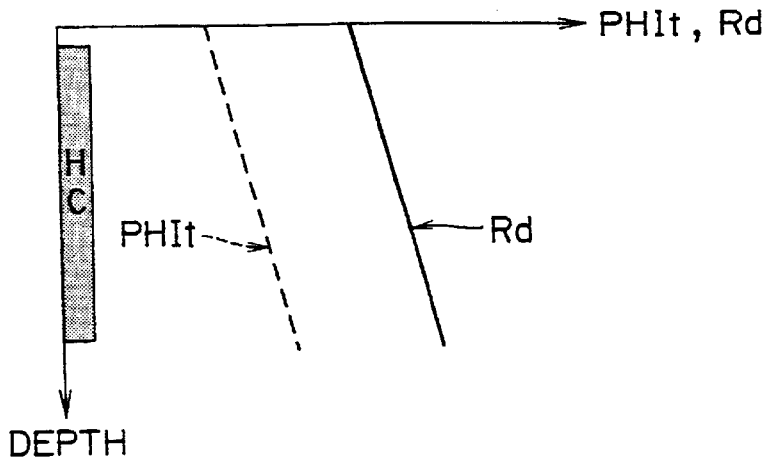
FIG. 5 shows a first form of variation of Rd and PHIt in a hydrocarbon-bearing formation.
Figure 6:
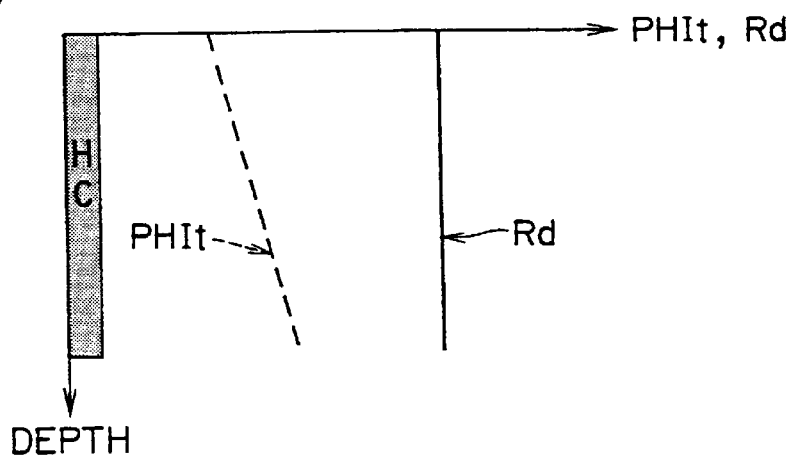
FIG. 6 shows a second form of variation of Rd and PHIt in a hydrocarbon-bearing formation.
Figure 7:
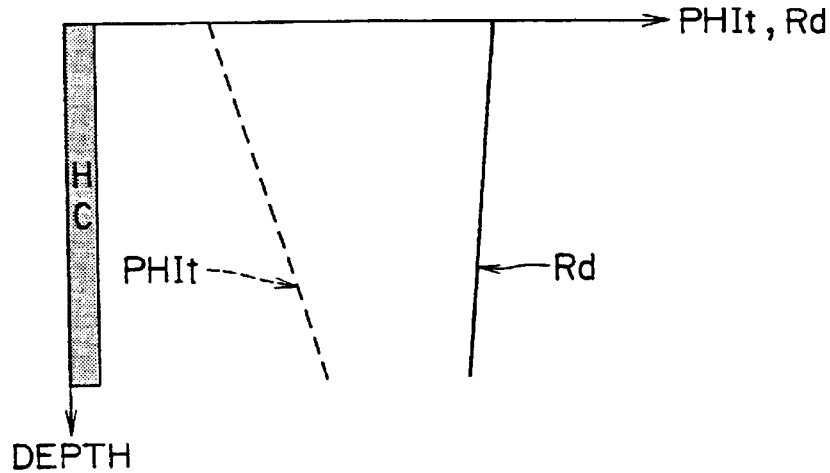
FIG. 7 shows a third form of variation of Rd and PHIt in a hydrocarbon-bearing formation.

Because the formation water resistivity Rw is constant in a single formation, that is Rw=C, Rd is related to both PHIt and PHIff. There are three possible relationships between Rd, PHIt and PHIff:

a) The rate of change of the porosity and resistivity parameters with depth is in the same direction, i.e. both Rd and PHIt increase (or decrease) over depth. Another way to put this is: PHIt increases, PHIt−PHIff decreases and Rd increases (or PHIff increases greatly, PHIt increases less, and Rd increases). During the formation of the hydrocarbon reservoirs in geological history, the hydrocarbon always tries to replace the water in the bigger pores which is free (movable) rather than the water in the smaller pores which is bound by capillary force of the smaller pores or the water in clay which is bound by clay minerals. The phenomenon PHIt increases, PHIt−PHIff decreases and Rd increases appears when the free fluid pore space PHIff is fully or partially filled with hydrocarbon (see FIG. 5, HC=hydrocarbon zone). Therefore, if both Rd and PHIt increase (or decrease) over depth, the formation must be hydrocarbon bearing.

b) The resistivity parameter remains relatively constant with depth and the porosity parameter increases (or decreases) with depth. Put another way: PHIt increases, PHIt−PHIff is Constant, Rd is C (or PHIff increases, PHIt increases, Rd is Constant). As with the previous case, this phenomenon appears only if the free fluid pore space PHIff is fully or partially filled with hydrocarbon (see FIG. 6, HC=hydrocarbon zone). Therefore, if Rd remains relatively constant with depth and PHIt increases (or decreases) with depth, the formations must be hydrocarbon bearing.

c) The rate of change of the resistivity parameter is relatively small over depth and the rate of change of the porosity parameter over depth is in the opposite direction. Put another way: PHIt increases, PHIt−PHIff increases, and Rd decreases slowly (or PHIff increases, PHIt increases greatly, Rd decreases, or PHIff decreases, PHIt increases, and Rd decreases). The rate of the Rd decreasing with the PHIt increasing is $dRd/dPHIt=2E*Rw(PHIt-PHIff)$ in this case. It is obviously smaller than the rate in the case of a water bearing formation (described above) even if all other conditions such as the porosity, clay volume, lithology etc. are absolutely same (see FIG. 7, HC=hydrocarbon zone, and FIG. 4). For the purpose of quantitatively identifying the fluid type of a formation, it can be difficult to differentiate hydrocarbon-bearing formations and the water-bearing formations with only measurements of Rd and the PHIt, and measurement of PHIff might be needed to confirm the identification (see below).

The following three methods can be used to further differentiate the hydrocarbon-bearing formations and the water-bearing formations:

1. Differentiating With Three Logs PHIt PHIff and Rd

|   | PHIt | PHIff | PHIt − PHIff | Rd | Formation Type |
|---|---|---|---|---|---|
| c-1) | ↑ | ↑ | C | ↓ | definitely water-bearing |
| c-2) | ↑ | ↑↑ | ↓ | ↓ | definitely water-bearing |
| c-3) | ↑ | ↓ | ↑ | ↓ | hydrocarbon or water-bearing |
| c-4) | ↑↑ | ↑ | ↑ | ↓ | hydrocarbon or water-bearing |

2. Differentiating by Zoning Within One Formation and Logic

In the cases of c-3) and c-4) above, a formation can be divided into zones according to changes in direction of the change in PHIt over depth (increase to decrease or vice versa). After zoning, it is usually possible to identify one or more parts of the formation which are definitely hydrocarbon-bearing or water-bearing. Basic physical logic rules can then be applied to identify the fluid type at a given depth, e.g. it is impossible that the upper part is water-bearing and the lower part is hydrocarbon-bearing in one single formation.

3. Differentiating Based on the Fine Correlation Property of PHIt, PHIff and Rd

Figure 8:
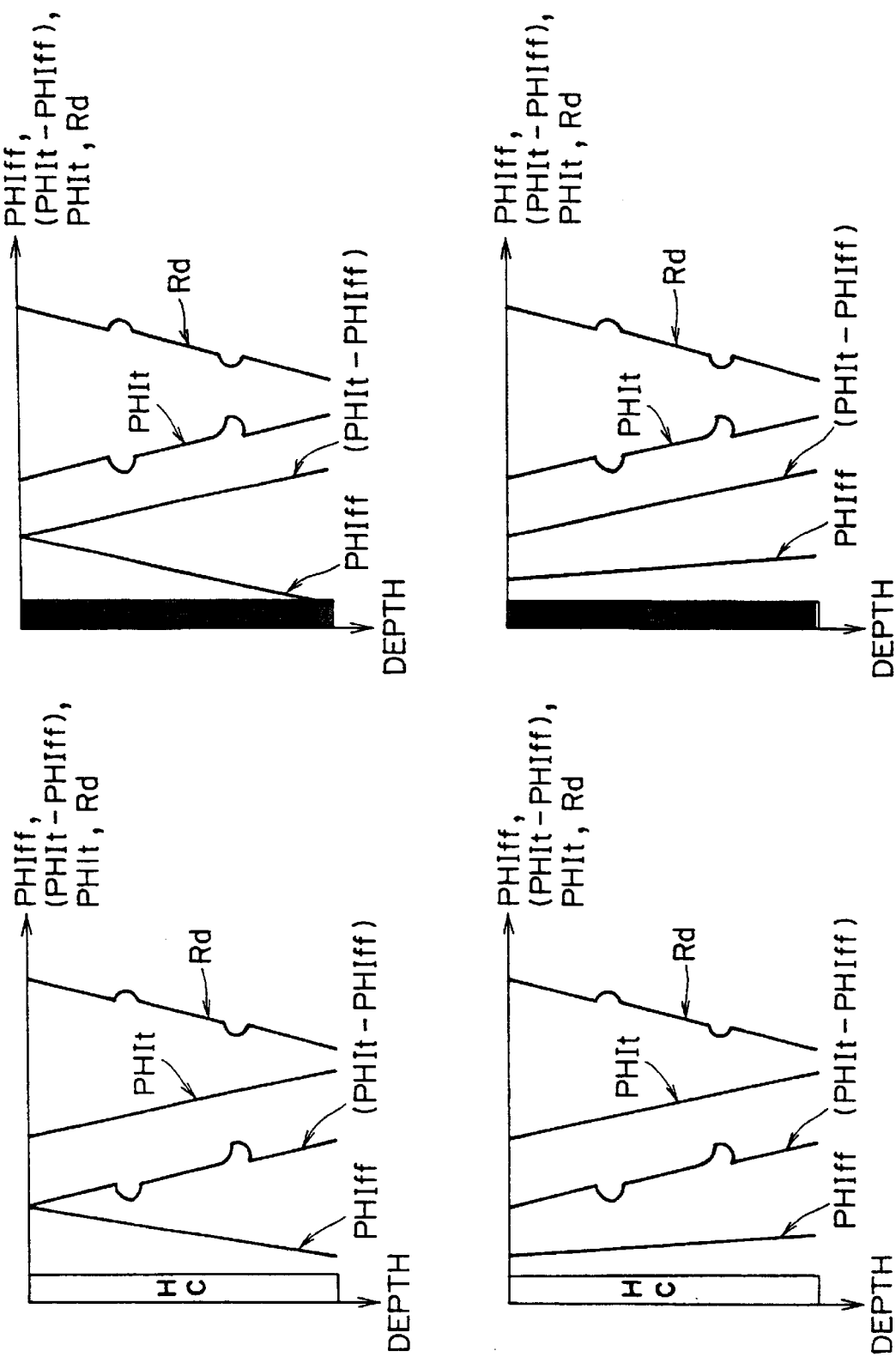
FIG. 8 shows correlations of the fine structure of Rd, PHIt and (PHIt−PHIff) to distinguish between water-bearing and hydrocarbon-bearing formations.

Fine correlation properties of Rd+PHIff, Rd+PHIt and Rd+(PHIt−PHIff) can be used to further identify the fluid type of the formation. In the cases of c-3) or c-4) in 1. above, correlation of the fine structure of (PHIt−PHIff) with Rd is indicative of a hydrocarbon-bearing formation. If there is correlation of the fine structure of PHIt with Rd, the formation is water-bearing (see FIG. 8).

The measurement of a suitable resistivity parameter such as Rd can be made by any suitable resistivity logging tool, for example Schlumberger's AIT Array Induction Tool, or an appropriate laterolog tool making a LLD measurement. In its simplest form, the present invention merely requires some measurement of a porosity parameter. However, the ability of magnetic resonance techniques to differentiate between PHIt and PHIff make this a particularly preferred measurement to use in the method of the present invention. Schlumberger's CMR Combinable Magnetic Resonance tool is one example of this.

The method according to the present invention can be used alone or, more preferably, in conjunction with other techniques for determining the nature of the formation fluid. In such cases, the relative strengths and weaknesses of each technique should be assessed in order to determine how much weight should be given to the determination delivered by each.

Figure 9:
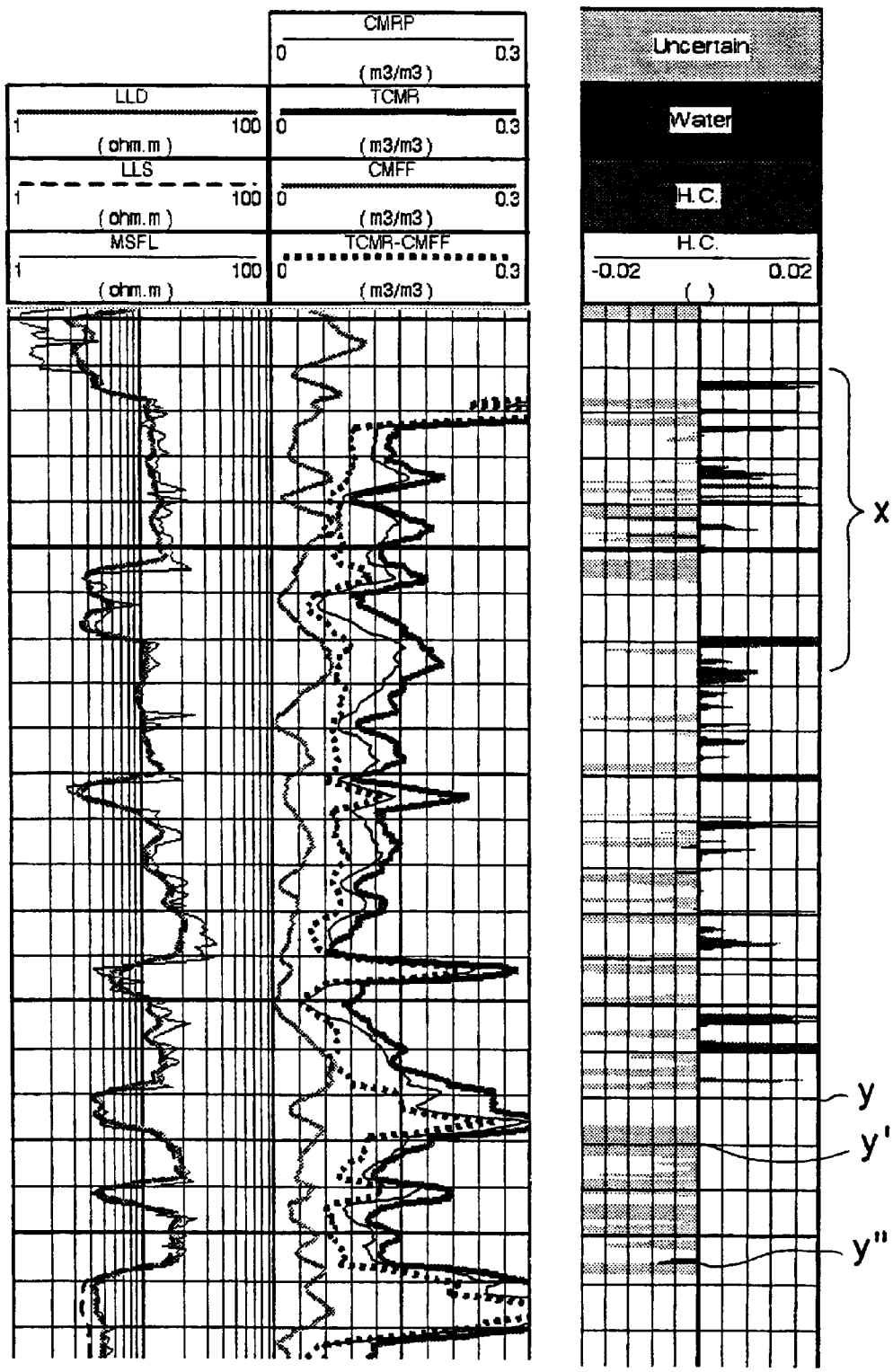
FIG. 9 shows a section of log data with formation fluid type indications determined according to an embodiment the method of the present invention.

FIG. 9 shows logs of resistivity (LLD, LLS and MSFL) and porosity (TCMR, CMFF and TCMR-CMFF) over an interval of a borehole. The method of the present invention is used to generate the log at right which indicates the fluid type as hydrocarbon (HC), water or uncertain. Where there are areas of uncertainty interspersed with high confidence indications of hydrocarbon (see for example region X), it is assumed that the formation interval is hydrocarbon-bearing. At point Y and below, there are no indications of hydrocarbon but some of water (y' and y"), this indicates that the formation interval is water-bearing. Testing of the formation fluids at these points can confirm these designations.

INDUSTRIAL APPLICABILITY

The present invention finds application in the field of characterizing underground formations surrounding borehole such as in the oil and gas industry.

What is claimed is:

1. A method for determining the nature of a formation fluid surrounding a borehole, comprising:

a) determining the rate of change with depth of a electrical resistivity parameter of the formation surrounding the borehole;

b) determining the rate of change with depth of a porosity parameter of the formation surrounding the borehole;

c) determining a comparison of the rate of change with depth of a resistivity parameter and the rate of change with depth of a porosity parameter for a given depth in the borehole; and d) using the comparison to determine the nature of the fluid in the formation surrounding the borehole at that depth.

2. A method as claimed in claim 1, wherein the resistivity parameter comprises a measurement of formation deep resistivity.

3. A method as claimed in claim 1, wherein the porosity parameter is measured using a nuclear magnetic resonance technique.

4. A method as claimed in claim 1, wherein porosity parameter comprises a measurement of formation total porosity.

5. A method as claimed in claim 4, wherein the porosity parameter also comprise a measurement of free fluid porosity.

6. A method as claimed in claim 1, wherein the comparison is output as an indication of fluid type and a value indicating the confidence of the determination.

7. A method as claimed in claim 1, wherein the comparison is used to determine fluid type in a depth window in the borehole.

8. A method as claimed in claim 1 comprising determining the rate of change with depth of formation deep resistivity, formation total porosity, formation free fluid porosity, and (formation total porosity minus formation free fluid porosity), and using correlation of fine feature between any two of these to indicate formation fluid type.

9. A method as claimed in claim 8, wherein correlation of fine features between (formation total porosity minus formation free fluid porosity) and deep resistivity is used to indicate hydrocarbon fluids, and correlation of fine features between formation total porosity and deep resistivity is used to indicate water.

10. A method for determining the nature of a formation fluid surrounding a borehole, comprising:
   a) determining the rate of change with depth of a electrical resistivity parameter of the formation surrounding the borehole, wherein said resistivity parameter comprises a measurement of formation deep resistivity;
   b) determining the rate of change with depth of a porosity parameter of the formation surrounding the borehole, wherein said porosity parameter is measured using a nuclear magnetic resonance technique;
   c) determining a comparison of the rate of change with depth of a resistivity parameter and the rate of change with depth of a porosity parameter for a given depth in the borehole; and
   d) using the comparison to determine the nature of the fluid in the formation surrounding the borehole at that depth.

11. A method as claimed in claim 10, wherein said comparison is used to determine fluid type in a depth window in a borehole.

12. A method as claimed in claim 10, further comprising determining rate of change with depth of formation deep resistivity, formation total porosity, formation free fluid porosity, and (formation total porosity minus formation free fluid porosity), and using correlation of fine features between any two of these to indicate formation fluid type.

13. A method as claimed in claim 12, wherein correlation of fine features between (formation total porosity minus formation free fluid porosity) and deep resistivity is used to indicate hydrocarbon fluids, and correlation of fine features between total formation porosity and deep resistivity is used to indicate water.

14. A method as claimed in claim 10, wherein the comparison is output as an indication of fluid type and a value indicating the confidence of the determination.

15. A method for determining the nature of a formation fluid surrounding a borehole, comprising:
   a) determining the rate of change with depth of a electrical resistivity parameter of the formation surrounding the borehole;
   b) determining the rate of change with depth of a porosity parameter of the formation surrounding the borehole, wherein said porosity parameter comprises a measurement of formation total porosity;
   c) determining a comparison of the rate of change with depth of a resistivity parameter and the rate of change with depth of a porosity parameter for a given depth in the borehole; and
   d) using the comparison to determine the nature of the fluid in the formation surrounding the borehole at that depth, wherein the comparison is output as an indication of fluid type.

16. A method as claimed in claim 15, wherein said porosity parameter also comprises a measurement of free fluid porosity.

17. A method as claimed in claim 15, wherein said comparison is used to determine fluid type in a depth window in the borehole.

18. A method as claimed in claim 15, further comprising determining the rate of change with depth of formation deep resistivity, formation total porosity, formation free fluid porosity, and (formation total porosity minus formation free fluid porosity), and using correlation of fine feature between any two of these to indicated formation fluid type.

19. A method as claimed in claim 18, wherein correlation of the fine features between (formation total porosity minus formation free fluid porosity) and deep resistivity is used to indicated hydrocarbon fluids, and correlation of fine features between total formation porosity and deep resistivity is used to indicate water.

20. A method as claimed in claim 15, wherein the resistivity parameter comprises a measurement of formation deep resistivity and the porosity parameter is measured using a nuclear magnetic resonance technique.

* * * * *